United States Patent [19]

Maldavs

[11] 4,398,561

[45] Aug. 16, 1983

[54] QUICK DISCONNECT COUPLING WITH LOCKED VALVING

[75] Inventor: Ojars Maldavs, Lincoln, Nebr.

[73] Assignee: Imperial Clevite Inc., Rolling Meadows, Ill.

[21] Appl. No.: 248,399

[22] Filed: Mar. 27, 1981

[51] Int. Cl.³ ............................................. F16L 37/28
[52] U.S. Cl. .............................. 137/614.05; 137/614; 251/149.6
[58] Field of Search .......................... 137/614, 614.05; 251/149.6

[56] References Cited

U.S. PATENT DOCUMENTS

| 2,735,696 | 2/1956 | Omon et al. | 137/614.05 |
| 3,348,575 | 10/1967 | Simak | 137/614.05 |
| 3,482,602 | 11/1969 | Jarnagon et al. | 137/614.05 |
| 4,200,121 | 4/1980 | Walter et al. | 137/614.05 |

Primary Examiner—A. Michael Chambers
Attorney, Agent, or Firm—Russell E. Baumann

[57] ABSTRACT

A quick disconnect coupling having locked valving wherein balls interposed between a shiftable valve element and a stationary guide and which normally emerge during valve seating are blocked by movement of a spring loaded sleeve responsive to high flow conditions from the male half to the female half.

3 Claims, 7 Drawing Figures

QUICK DISCONNECT COUPLING WITH LOCKED VALVING

BACKGROUND AND SUMMARY OF INVENTION

This invention relates to a quick disconnect coupling with locked valving and, more particularly, to the female half of the coupling.

The invention finds utility in connecting and disconnecting hydraulic hoses, generally used on agricultural equipment. The female half is mounted on the tractor and is connected to the tractor hydraulic system. The male half is the implement hose and can be a commercially available male half.

Couplings used on agriculture equipment have a unique requirement in addition to normal connecting and disconnecting of the hydraulic hoses. It is quite common for the male half (implement half) to have trapped hydraulic pressure in the hose. Conventional hydraulic couplings will not connect with trapped pressure in the hose. However, agricultural couplings such as those illustrated in U.S. Pat. No. 3,163,178 will connect against trapped pressure in the male half—this being accomplished by allowing valve overtravel in the female. However, the problem with the above-mentioned design (and similar designs such as those found in U.S. Pat. Nos. 3,477,468, 3,482,602 and 4,098,292) is that the valves are held in the open position by springs. Thus, under high fluid flow conditions (male to female direction) the fluid force or pressure drop exceeds the spring force. When that happens, the valve shift and the coupling closes off the flow. When this condition happens (flow being stopped) the implement may be damaged and the operator must reset the coupling. This disadvantageous operating is avoided by the instant invention which prevents the problem by locking the valve open during high flow conditions.

This is achieved in the illustrated embodiment of the invention through the provision of a supplementary sleeve for the female valve element which blocks radial movement of positioning balls interposed between the valve element and the valve guide. In normal operation, these balls are free to move radially outward and when the female half valve is closed are in a radially outward position. Through the use of the above-mentioned sleeve, the turbulents of the reverse flow moves the sleeve into blocking relation and thus prevents closing of the female half valve until the reverse flow condition ceases or is reduced to a predetermined, acceptable value.

Other objects and advantages of the invention may be seen in the details of the ensuing description.

DETAILED DESCRIPTION

Figure 1:
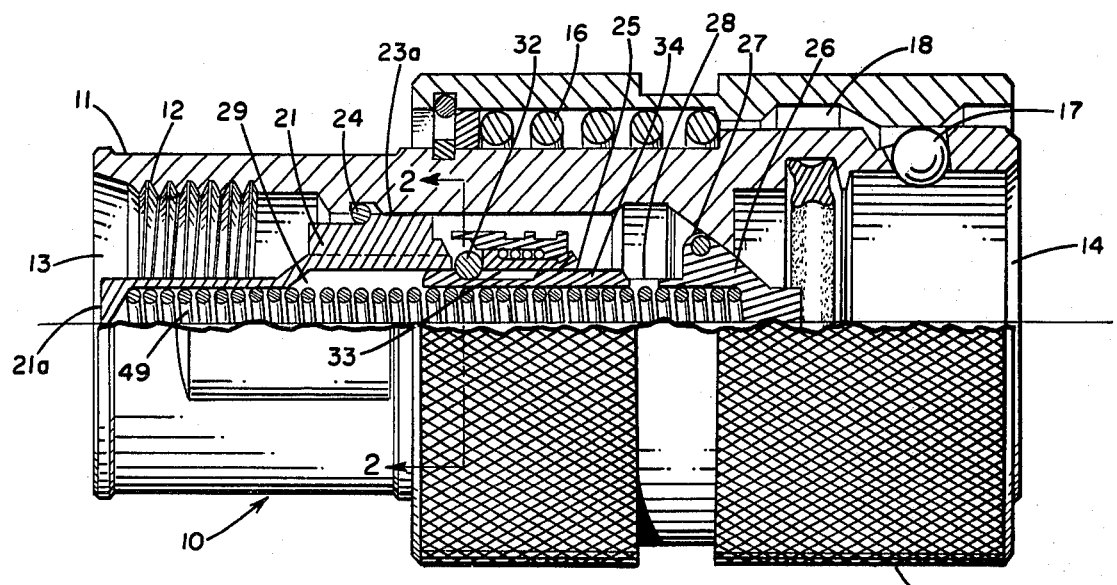
FIG. 1 is an elevational view, partially in section of a female half of a quick disconnect coupling and showing the female half valve in closed, i.e., seated condition.

In the illustration given and with reference first to FIG. 1, the numeral 10 designates generally the uncoupled female half of a quick disconnect coupling. The female half includes a tubular body 11 which is threaded as at 12 to provide a means for connection via a hydraulic hose to the tractor's hydraulic system. Thus, the end 13 can be considered the normal source end, i.e., the end connected to the source of hydraulic fluid.

The other end of the body 11 is designated 14 and is the end adapted to be connected to the male half associated with the agricultural implement to be hydraulically operated. Thus, the end 14 can be considered the implement end of the body 11. Associated with the body 11 adjacent the implement end 14 is a conventional collar 15 which is slidable on the exterior of the body 11 against the force of spring 16 so as to permit ball 17 to move up into recess 18 and thus effect the interconnection with the male half. Once the male half generally designated 19 in FIG. 3 is in position with its recess 20 aligned with the ball 17, the collar 15 can be released bringing about the configuration seen in FIG. 3 and where the female and male halves 10 and 19 are coupled.

Referring again to FIG. 1, the numeral 21 designates a guide which is fixedly mounted within the tubular body 11 and which extends axially thereof from the source N as at 21a. The guide 21 can also be seen in FIG. 2 and there includes a tubular body 22 equipped with integral circumferentially spaced apart mounting ribs 23. In the illustration given, the mounting ribs are press fitted within the tubular bore of the body 11 as at 23a of FIG. 1 and are maintained in place by means of a suitable snap ring 24 (still referring to the upper left hand portion of FIG. 1.

Slidably mounted within the guide 21 is a valve element generally designated 25. The element 25, like the guide 21 is relatively elongated in an axial direction and at its implement end is equipped with a valve head 26. The valve head 26 (as illustrated in FIG. 1) is seen to be seated against a valve seat 27 (provided on the interior of the body 11.) Installed in the hollow interior of the guide 21 and the valve element 25 is a coiled spring 26 which urges the valve element 26 to the right and against the seat 27. A hole 28 is provided in the valve element adjacent the valve head 27 to allow oil to enter and escape the cavity 29 (formed by the interiors of the guide 21 and valve element 25) during movement of the valve element 25.

Figure 3:
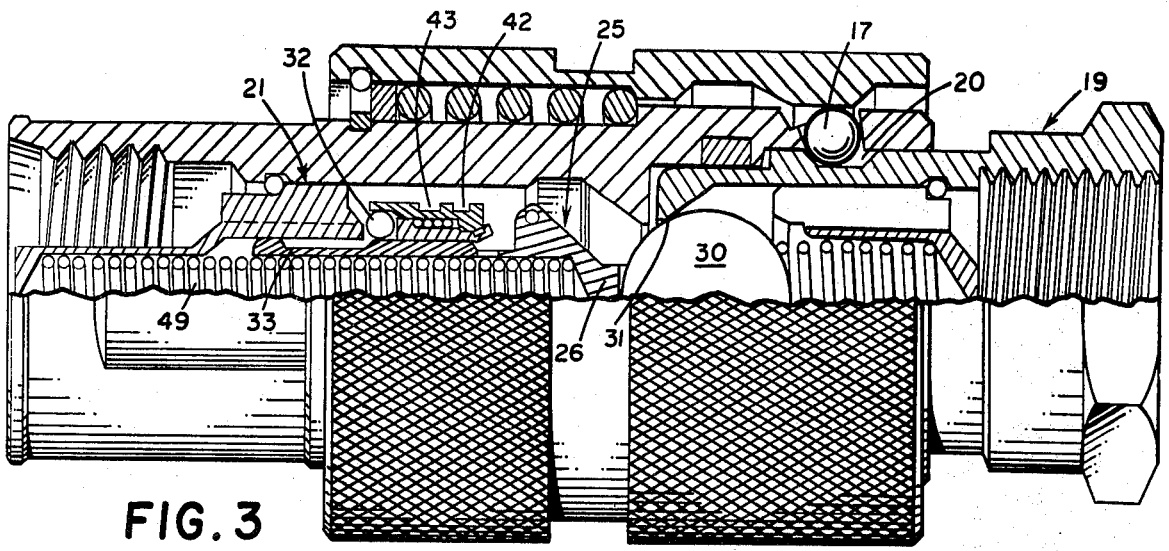
FIG. 3 is an elevational view of the complete coupling in assembled condition, partially broken away to show the working parts and wherein the male half valve is closed.

Now referring to FIG. 3, the coupling halves are illustrated in the condition where the female half 10 is coupled to the male half 19 with the balls 17 holding the two halves together. The condition illustrated is where the male half is pressurized and there is zero pressure on the female half. Since the male half 19 is pressurized, its valve 30 remains closed against the associated seat 31. This is possible since the valve element 25 in the female half 10 retracts inside the guide 21 against the spring 26 a sufficient distance to permit connection.

Figure 2:
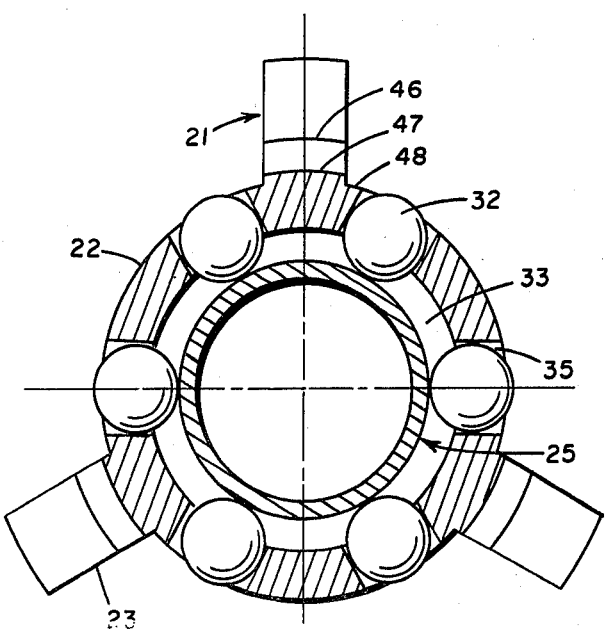
FIG. 2 is an enlarged sectional view such as would be seen along the sight line 2—2 of FIG. 1.

By comparing the position of balls 32 in FIGS. 1 and 3, it will be seen that they are oriented differently. In FIG. 1, for example, the balls 32 (six being provided as seen in FIG. 2) are oriented within an associated groove 33. The groove 33 at its implement end is equipped with a ramp 34 and the operation wherein the two halves are coupled results in the balls 32 riding up the ramp 34 to the position illustrated in FIG. 3. To provide the groove 33, the valve element 25 has a reduced wall thickness as can be appreciated from a comparison of FIGS. 1 and 2. The balls 32 themselves are mounted within a plurality of radially extending openings 35 provided in the tubular portion 22 of the guide 21. This operation is seen in somewhat larger scale in FIG. 6 where the radially outward position of the ball 32 is seen in dotted line and is designated 32'. At this point, the male half is still pressurized and the female half is unpressurized, viz., the showing in FIG. 3. Now that the coupling is connected, the operator operates the hydraulic control valve (not shown) but provided on the tractor (also not shown) to pressurize the female half. When the female half pressure approximately equals the male half pressure, the valve head 26 in the female half and the valve 30 in the male half shift to the right under the influence of the force of spring 26 to the position illustrated in FIG. 4.

The force of spring 26 is greater than the force of spring 36—the latter being associated with the ball valve 30. Therefore, under no flow and normal flow conditions, the ball valve 30 is against the stop 37 provided in the male half 19 and the valve head 26 is in contact against the valve 30. When valve head 26 and valve 30 are off of the seats 27 and 37, respectively, fluid flow is permitted through the complete coupling, i.e., tractor to implement and vice versa.

High Flow From Implement To Source

Figure 5:
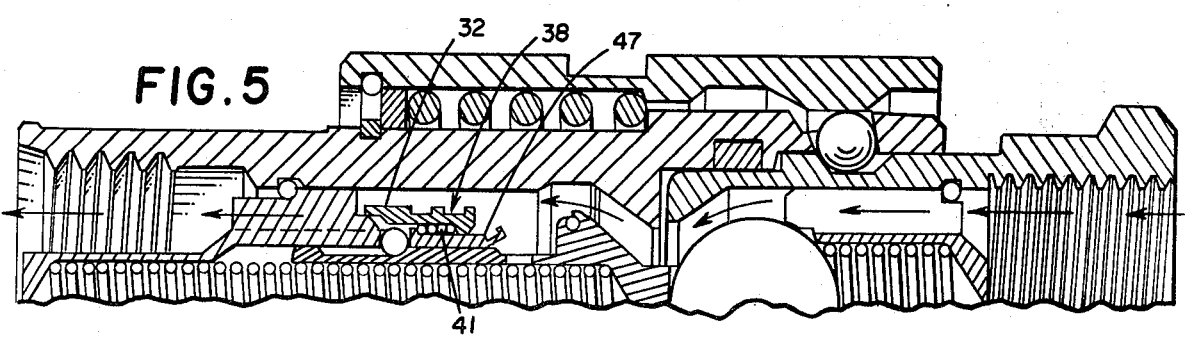
FIG. 5 is is a view similar to FIG. 4 but wherein the valves are in locked open condition.

Reference is now made to FIG. 5 which illustrates the novel locking feature of the invention and which comes into play when there is a high flow condition in the male half—to female half direction, i.e., right to left, as indicated by the arrows in FIG. 5. What happens then is a sleeve generally designated 38 moves to the left into blocking relation with the balls 32—compare FIGS. 6 and 7.

The slide 38 is another tubular member relatively elongated in the axial direction and is slidably mounted on the tubular portion 22 of the guide 21. More particularly, the guide 21 at its implement end is equipped with a reduced thickness wall to provide an annular recess 39 (see FIG. 4). The slide 38 is interiorly recessed as at 40 (still referring to FIG. 4) and the two recesses cooperate to provide a cavity for the mounting of a spring 41. The spring 41 normally urges the sleeve 38 toward the implement end and thus out of blocking relation with respect to the balls 32.

However, during high flow conditions, the sleeve 38 is shifted to the left, i.e., toward the source end, against the force of the spring 41. The fluid flowing across the sleeve has sufficient force to shift it to the left. This is aided by grooves 42 and 43 (see FIG. 3) which generate turbulence and drag force. Also, the grooves reduce the mass of the sleeve 38 for faster response, i.e., lower inertia, and cause higher flow gradients.

Figure 4:
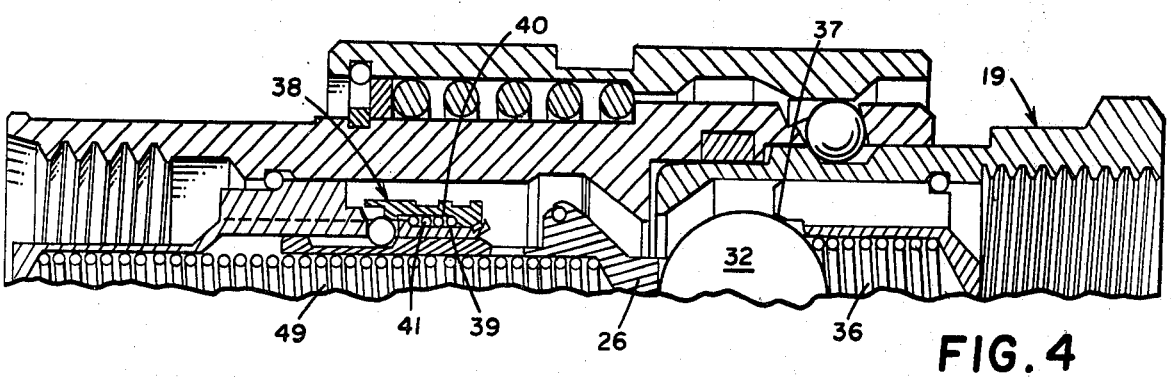
FIG. 4 is a fragmentary sectional view (corresponding essentially to the top half of FIG. 3) wherein the valves of both halves are in open condition.
Figures 6, 7:
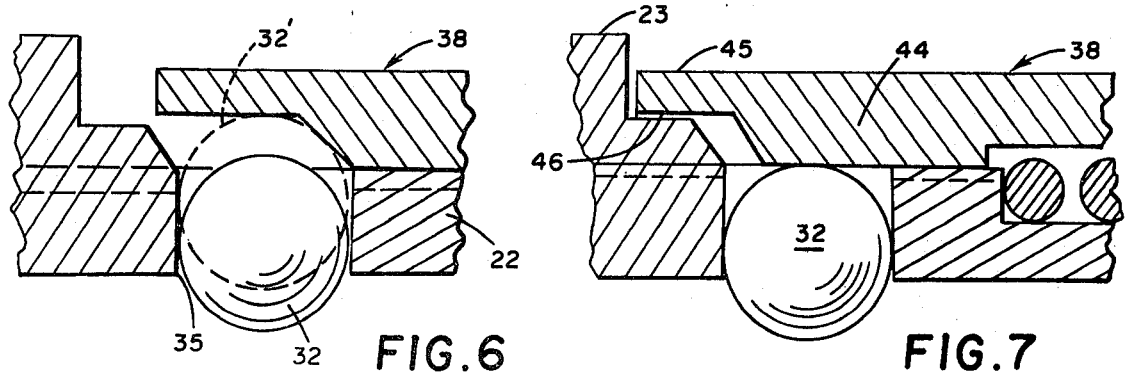
FIG. 6 is an enlarged fragmentary sectional view showing the condition of the locking parts as they are in FIGS. 3 and 4.
FIG. 7 is a view similar to FIG. 6 but showing the locking parts as they are depicted in FIG. 5.

As can be appreciated from a comparison of FIGS. 4 and 5, the sleeve 38 at its source end has a portion as at 44 in FIG. 7 which enters into blocking relationship with respect to the balls 32. Thus, when the sleeve 38 is shifted, it is over the balls 32 which retains the balls in the groove 33. This prevents the valve element 25 from shifting to the right under high flow conditions—to the condition of FIG. 1—and thus prevents the coupling valves from closing. When the flow rate returns to zero or a predetermined low flow condition, the spring 41 shifts the sleeve 38 back to the position shown in FIG. 3.

The blocking portion 44 is extended toward the source N to provide a part 45 which overlies a reduced diameter portion of the ribs 23 as at 46—see also FIG. 2.

The cavity defined by the recesses 39 and 40 and housing the spring 41 is vented to the main flow stream due to the differences in diameters of the sleeve 38 and guide tubular portion 22 where the same are engaged. For example, and with reference to FIG. 2, the sleeve is guided on the landed area 47 which is seen to be slightly larger in diameter than the adjacent section of the tubular section 22 as at 48 in FIG. 2. This provides a passage for oil to escape from the cavity housing the spring 41 and such venting permits rapid response of the sleeve 38 to shift with changes in fluid flow direction and velocity.

The inventive construction also provides the option of moving the ramp 34 to the right a small distance. This would permit the valving to shift to the left slightly during high flow conditions. This option would allow the coupling to serve as a restrictor or surge dampener without completely closing off the flow. This is a feature available when the user does not want high flows returning to the tractor hydraulic system to cause damage or malfunction.

Through the provision of the invention there is a locking mechanism that prevents internal valve shifting during high reverse flows. Further, the invention involves a valve locking mechanism that is flow responsive, i.e., it operates under high flow conditions when the need for a lock exists and the value of the flow triggering operating of the sleeve 38 can be regulated by the strength or rate of the spring 41. This results in a valve locking mechanism that is simple, easy to manufacture and has a low manufacturing cost. This simplicity also makes it a very reliable design—the sleeve and spring being the only moving parts to engage the lock. Further, special "shrouded" male mating halves are not required with this female half—as has been the case with other non-locked designed. Thus, this female design, because of the lock, will function properly with a wide variety of male halves.

While in the foregoing specification a detailed description of an embodiment of the invention has been set down for the purpose of illustration, many variations in the details hereingiven may be made by those skilled in the art without departing from the spirit and scope of the invention.

I claim:

1. A quick disconnect coupling with locked valving comprising a tubular body having a port at one end for connection to a source of hydraulic fluid and collar means at the other end for connection to the male half of a coupling associated with a hydraulically operated implement, said body adjacent said implement and being equipped with a valve seat, a relatively elongated tubular guide fixedly mounted within said body extending axially thereof from said source end, relatively elongated valve element slidably mounted in said guide and extending axially of said body toward said implement end and equipped with a valve head at the implement end thereof, means in said guide resiliently urging said valve head into seating engagement with said seat, an annular groove in the outer wall of said valve element, a plurality of balls in said groove and projecting radially outwardly therefrom, a plurality of ball supporting openings in said guide, one for each ball and aligned with said groove, said groove having a predetermined axial length and equipped with a ramp at the groove end adjacent said body implement and at such position that when said valve element is moved toward open position by engagement with the closed valve of the male half, said balls emerge from said groove, a flow sensitive sleeve slidably mounted on said guide between said groove and said valve head and having a portion adapted to overlie said balls and block the emergence thereof from said groove, spring means interposed between said sleeve and guide resiliently urging said sleeve toward said implement end to position said sleeve portion out of blocking relation with said balls, said spring means being so sized and constructed as to permit movement of said sleeve toward said source end at a predetermined rate of fluid flow toward said source end and thereby position said sleeve portion in blocking relation with said balls and thereby prevent emergence of the same while said flow rate persists and thus preventing said valve head from engaging said seat.

2. The structure of claim 1 in which said sleeve is equipped with exterior circumferential grooves to facilitate movement of said sleeve by reducing the inertia thereof and creating turbulent drag force.

3. The structure of claim 1 in which said guide between at least certain of said opening is equipped with externally projecting landed areas arranged in bearing engagement with said sleeve whereby an annular space is created to permit flow of fluid from around said spring means upon movement of said sleeve.

* * * * *